United States Patent

Belot et al.

[11] 4,041,794
[45] Aug. 16, 1977

[54] MECHANISM OF TRANSMISSION

[75] Inventors: Michel Belot, Boudry; Norberto Perucchi, Saint-Blaise, both of Switzerland

[73] Assignee: Ebauches S.A., Switzerland

[21] Appl. No.: 733,994

[22] Filed: Oct. 20, 1976

[51] Int. Cl.² ............... F16H 55/04; F16H 55/06
[52] U.S. Cl. ................................. 74/460; 74/462
[58] Field of Search ..................... 74/457, 460, 462

[56] References Cited
U.S. PATENT DOCUMENTS

| 2,760,381 | 8/1956 | Pickles | 74/460 X |
| 3,817,117 | 6/1974 | Kita et al. | 74/462 |

Primary Examiner—Leonard H. Gerin
Attorney, Agent, or Firm—Silverman & Cass, Ltd.

[57] ABSTRACT

A gear transmission mechanism including two toothed wheels meshed with each other. One wheel is of greater module than the other. When the wheel of greater module is driving the other the rotation of the mechanism takes place normally, whereas when the said other wheel is driving the teeth of the wheels are locked to prevent rotation.

10 Claims, 5 Drawing Figures

MECHANISM OF TRANSMISSION

It is to be noted that one understands here by "wheel" any toothed circular member, whatever the number of its teeth may be, that is to say it be constituted properly by a wheel or by a pinion.

This mechanism is characterized by the fact that the module of one of the said wheels is greater of 10 to 20% than this one of the other wheel, so that, when the wheel of great module is driving, the rotation of the mechanism takes place normally, the wheel of small module being duly driven while, when the wheel of small module is driving, a locking effect takes place between the teeth of the two wheels, preventing any rotation.

The purpose of the invention is to furnish a gear transmission mechanism which be irreversible, that permits to ensure a correct transmission in one sense or in the other, when one of the two elements of the mechanism is driving while, when the other element becomes driving, the mechanism is locked, preventing then any rotation.

The drawing shows, by way of example, four embodiments of the object of the invention.

Figure 1:
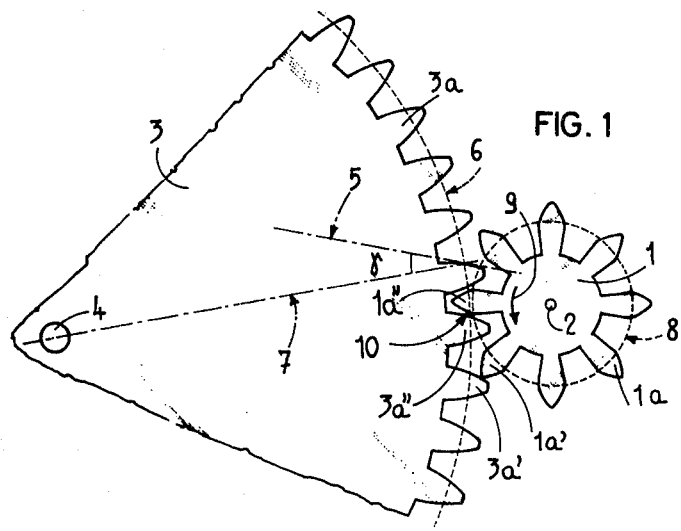
FIG. 1 is a plane view of a first embodiment of a driving mechanism represented in normal operating condition.
Figure 2:
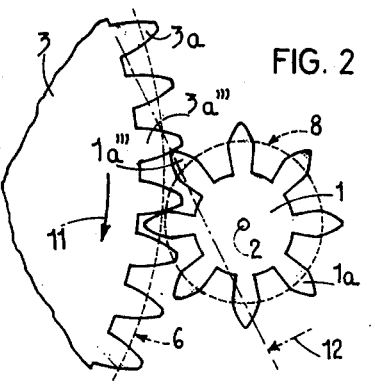
FIG. 2 is a plane view of this same mechanism represented in locked position.

In the embodiment of FIGS. 1 and 2, the transmission mechanism comprises a pinion 1, the center of which is indicated at 2, and a wheel 3, the center of which is at 4.

The following table gives constructive data relating to this embodiment:

|  | PINION 1 | WHEEL 3 |
|---|---|---|
| Number of teeth Z | 8 | 48 |
| Module M | 8/100 | 7/100 |
| Angle γ | 20° | 20° |
| Primitive diameter | 0,64 | 3,36 |
| Bottom diameter | 0,4 | 3,15 |
| Outer diameter | 0,8 | 3,5 |
| Developed diameter | 0,601403 | 3,15737 |

The angle γ is the angle between the tangent, for each wheel, designated by 5 at FIG. 1, to the profile of the tooth, at the point of intersection of this profile with the primitive circle, designated by 6, with the radius of the wheel, designated by 7, passing through this same point. The primitive circle of the pinion 1 has been designated 8.

The unities of length, for the diameters, can be millimeters or centimeters, for instance.

It can be seen that the difference between the two modules is slightly higher than 10%.

When the pinion 1 is driving, rotating in one sense or in the other, for instance in the sense of the arrow 9 of FIG. 1, it drives normally the wheel 3. It can be seen that, when one tooth, designated by 1a', of the pinion 1, is on the point of being released by a tooth, designated by 3a', of the wheel 3 that it drives, in the position represented in FIG. 1, a free space 10 remains between the following teeth 1a'' and 3a'' of the pinion and of the wheel, respectively, so that the driving is not effected smoothly. The experience shows that, in most of the cases, this does not show any practical inconvenience.

When the wheel 3 is driving, in one sense or in the other, for instance in the sense of arrow 11 of FIG. 2, one of its teeth, designated by 3a''', abuts against a tooth, designated by 1a''', of the wheel 1, the perpendicular line to the surface of the tooth 3a''', designated by 12, at the point of contact with the tooth 1a''' passing near the center of the pinion 1.

Consequently, it results from the arrangement as disclosed and represented that, when one of the two elements of the mechanism, i.e., the pinion 1, is driving, the driving is effected normally while, when it is the other one element which is driving, a locking is produced preventing any rotation, owing to which the said mechanism is of the irreversible type.

In the example of FIGS. 1 and 2, the two gears of the pinion 1 and of the wheel 3 are of the involute conventional type.

Figure 3:
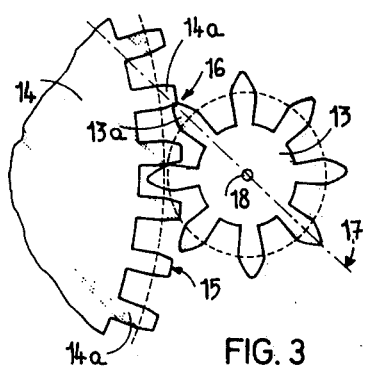
FIGS. 3, 4 and 5 are plane views of three other embodiments of driving mechanisms.

In the example of FIG. 3, where a pinion 13 and a wheel 14 have been represented, their toothings are also of the involute type, the tops of the teeth 14a of the wheel 14 having however been truncated at 15, so as to be of square shape.

The following table gives the constructive data relating to this embodiment:

|  | PINION 13 | WHEEL 14 |
|---|---|---|
| Number of teeth Z | 8 | 48 |
| Module M | 8/100 | 7/100 |
| Angle γ | 15° | 0° |
| Primitive diameter | 0,64 | 3,36 |
| Bottom diameter | 0,4 | 3,15 |
| Outer diameter | 0,8 | 3,5 |
| Developed diameter | 0,618193 | 3,36 |

It can be seen that, with respect to the first embodiment, the module and the angle γ are different. The locking is effected by a contact of the type "angle/angle", that is to say that an angle of one tooth 14a of the wheel 14 is in contact with an angle of one tooth 14a of the pinion 13, as indicated at 16 in FIG. 3. The straight line 17 corresponding to the line 12 of FIG. 2 passes through the center, designated by 18, of the pinion 13, so that the locking is total. It is however difficult to realize practically such a total locking since it necessitates tolerances of manufacturing very high.

Figures 4, 5:
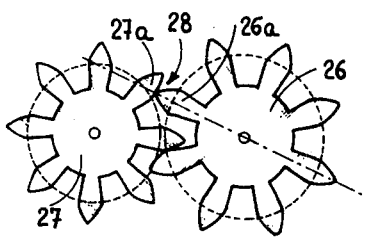

In the embodiment of FIG. 4, where a pinion 19 and a wheel 20 have been represented, the toothing of the pinion is of the involute type, the top of each tooth 19a showing a flat part 21, while the toothing of the wheel has round shaped ends, the lateral face of each tooth 20a being cylindrical at 22.

The following table indicates the constructive data of this embodiment:

|  | PINION 19 | WHEEL 20 |
|---|---|---|
| Number of teeth Z | 8 | 48 |
| Module M | 8/100 | 7/100 |
| Angle γ | 20° | — |
| Primitive diameter | 0,64 | 3,36 |
| Bottom diameter | 0,4 | 3,15 |
| Outer diameter | 0,8 | 3,5 |
| Developed diameter | 0,601403 | — |

There is no angle γ for the wheel 20, this data being not necessary for the construction of this wheel.

The operation of this embodiment is similar to this one of the two previous ones, the locking being obtained by contact "curve/flat part", that is to say that a curve surface of a tooth 20a of the wheel 20 is in contact with the flat part 21a of a tooth 19a of the pinion 19, as indicated at 23 in FIG. 4. The straight line 24 corresponding to the lines 12 and 17 of the two previous embodiments passes through the center, designated by 25, of the pinion 19, so that the locking is thus total.

In the embodiment of FIG. 5, where have been represented two pinions 26 and 27, the two toothings are of the involute type.

The following table indicates the constructive data of this embodiment:

|  | PINION 26 | PINION 27 |
|---|---|---|
| Number of teeth Z | 8 | 8 |
| Module M | 8/100 | 7/100 |
| Angle γ | 20° | 20° |
| Primitive diameter | 0,64 | 0,56 |
| Bottom diameter | 0,4 | 0,35 |
| Outer diameter | 0,8 | 0,7 |
| Developed diameter | 0,601403 | 0,526228 |

The operation of this embodiment is similar to this one of the previous one, that is to say that, when the pinion 26 is driving, the pinion 27 is driven normally, in one sense or in the other one while, if the pinion 27 is driving, one of its teeth 27a abuts against a tooth 26a of the pinion 26 producing a total locking obtained by a contact "angle/curve", as represented at 28.

In all embodiments disclosed and represented, the module of one of the two wheels is greater than this one of the other wheel, the difference being slightly higher than 10%. This difference can vary from 10 to 20%, but it must take place for the mechanism operating as desired, that is to say being irreversible.

Moreover, the two primitive circles are not in contact with each other since the distance separating the centers of the two wheels or of the two pinions is slightly greater than the sum of the radii of these two circles. The distance separating the primitive circles has been exaggerated in the several figures of the drawing so as to increase the clearness thereof.

As a modification, the wheel of great module could have a number of teeth higher than this one of the wheel of small module.

What we claim is:

1. Mechanism of transmission comprising two toothed wheels meshing with each other, characterized by the fact that the module of one of the said wheels is greater of 10 to 20% than this one of the other wheel, so that, when the wheel of great module is driving, the rotation of the mechanism takes place normally, the wheel of small module being duly driven while, when the wheel of small module is driving, a locking effect takes place between the teeth of the two wheels, preventing any rotation.

2. Mechanism as claimed in claim 1, characterized by the fact that the distance between the centers of the two wheels is higher than the sum of the radii of their two primitive circles.

3. Mechanism as claimed in claim 1, characterized by the fact that the end of the teeth of the wheel of small module is rounded.

4. Mechanism as claimed in claim 1, characterized by the fact that the end of the teeth of the wheel of small module is of square shape.

5. Mechanism as claimed in claim 1, characterized by the fact that each tooth of the wheel of great module has a surface substantially perpendicular to the radius of this wheel coinciding with the axis of the tooth, so that, when the wheel of small module is driving, the force exerted by a tooth of the wheel of small module on a tooth of the wheel of great module passes through the center of this last wheel, that produces the locking of the mechanism.

6. Mechanism as claimed in claim 5, characterized by the fact that the said surface of each tooth of the wheel of great module is constituted by a flat part.

7. Mechanism as claimed in claim 1, characterized by the fact that the end of each tooth of the wheel of small module is cylindrical.

8. Mechanism as claimed in claim 1, characterized by the fact that the wheel of great module comprises a number of teeth higher than the number of teeth of the wheel of small module.

9. Mechanism as claimed in claim 1, characterized by the fact that the wheel of great module comprises a number of teeth lower than the number of teeth of the wheel of small module.

10. Mechanism as claimed in claim 1, characterized by the fact that the two wheels have the same number of teeth.

* * * * *

UNITED STATES PATENT AND TRADEMARK OFFICE
CERTIFICATE OF CORRECTION

PATENT NO. : 4,041,794
DATED : August 16, 1977
INVENTOR(S) : MICHEL BELOT, et al It is certified that error appears in the above-identified patent and that said Letters Patent are hereby corrected as shown below:

On the cover page, before the classification data, read the following:

[30]  FOREIGN APPLICATION PRIORITY DATA

October 28, 1975   Switzerland   13,974/75

*Signed and Sealed this*

*Twenty-seventh* Day of *December 1977*

[SEAL]

Attest:

RUTH C. MASON
*Attesting Officer*

LUTRELLE F. PARKER
*Acting Commissioner of Patents and Trademarks*